United States Patent [19]

Schulz et al.

[11] 4,398,520

[45] Aug. 16, 1983

[54] IGNITION AND FUEL INJECTION SYSTEM FOR MULTICYLINDER ENGINES

[75] Inventors: Alfred Schulz, Oberriexingen; Martin Zechnall, Schwieberdingen, both of Fed. Rep. of Germany

[73] Assignee: Robert Bosch GmbH, Stuttgart, Fed. Rep. of Germany

[21] Appl. No.: 248,436

[22] Filed: Mar. 27, 1981

[30] Foreign Application Priority Data

Apr. 3, 1980 [DE] Fed. Rep. of Germany ....... 3013052

[51] Int. Cl.³ .................. F02D 17/02; F02B 3/00; F02D 9/00; F02D 5/00
[52] U.S. Cl. .................. 123/481; 123/198 F
[58] Field of Search .................. 123/481, 198 F; 364/431, 371

[56] References Cited

U.S. PATENT DOCUMENTS 4,040,395 8/1977 Demetrescu .................. 123/198 F
4,106,448 8/1978 Noguchi et al. .................. 123/198 F
4,144,864 3/1979 Kato et al. .................. 123/198 F
4,181,944 1/1980 Yamauchi et al. .................. 123/480
4,207,855 6/1980 Phillips .................. 123/198 F
4,207,856 6/1980 Sugasawa et al. .................. 123/198 F Primary Examiner—Raymond A. Nelli
Attorney, Agent, or Firm—Frishauf, Holtz, Goodman & Woodward

[57] ABSTRACT

The switching off of one or more cylinders of a multicylinder engine to save fuel when the engine is running lightly loaded has been found to reduce the effectiveness of computer control of ignition timing and fuel injection unless additional fields of stored control information are provided for responding to the various combinations of engine parameter values that arise in operation. Accordingly, with each step of reduction of the number of working cylinders, the control of ignition timing and fuel injection is shifted to a different bank of fixed value memory (ROM).

5 Claims, 2 Drawing Figures

IGNITION AND FUEL INJECTION SYSTEM FOR MULTICYLINDER ENGINES

This invention concerns ignition and fuel injection systems for multicylinder engines in which a computer is provided for controlling at least the ignition with reference to a number of parameters and having a feature that interrupts the fuel supply under certain conditions for at least one cylinder.

Computers controlling ignition and/or fuel injection events in internal combustion engines are known, for example, from disclosures in "Automobiltechnische Zeitschrift" 81 (1979)4, pp. 145-148 and "Elektronik" 1979, Issue 21, pp. 39-42. The systems there described have been installed in production motor vehicles since the middle of 1979. In these systems, a fixed value memory (ROM) stores the various points of a characteristic field and in accordance with the momentary values of various parameters of engine operation, the memory is interrogated to obtain the corresponding points of the field, in accordance with which the moment of ignition and/or the fuel injection quantity is computed and controlled.

Furthermore, for example from "Automobiltechnische Zeitschrift" 81 (1979)6, pp. 255-260 and "Automotive Engineering", Vol. 87, No. 3, pp. 100 to 101, it is known to switch off the fuel supply to one or more cylinders for saving energy, particularly during engine operation at partial load. The load dependent signal (e.g. the intake manifold vacuum signal) is thereby modified, as the result Since under these conditions the engine is generally lightly loaded, even for the smaller number of cylinders, the shift in the timing and/or fuel injection control to another point of characteristic field does not lead to any malfunction perceptible by the driver on which another point of the characteristic field is then selected and becomes effective in engine control.

THE INVENTION

By this invention, it was discovered that the shift of control from one part of the characteristic to another when the number of working cylinders is reduced the object of the reduction in working cylinders, saving of fuel may be in part defeated and the desired fuel combustion conditions may not be obtained.

Briefly, the ROM capacity of the computer, by the invention, is made to store two or more characteristic fields, one for all cylinders operation and one or more for operation with different numbers of cylinders operating and means are provided for switching from one characteristic field to another when the operation of at least one of the cylinders is interrupted, and again if there is a further reduction of the number of working cylinders.

Transfer to another characteristic field related to the number of cylinders still working at the moment has the advantage of providing optimum ignition timing and fuel injection control for partial as well as under full load operation of the engine. It is particularly advantageous to provide for automatic stepwise shutting off of cylinders by a power dependent signal. Corresponding to this stepwise shut-off system, according to the invention, a stepwise switching from one to another of a plurality of characteristic fields is provided, thus providing optimum operating conditions of the engine at each cylinder shut-down stage.

THE DRAWING

The invention is further described by way of illustrative example in the annexed drawing, in which FIG. 1 is a block diagram of a system utilizing two characteristic fields and one stage of cylinder shut-off, and FIG. 2 is a block diagram of a system according to the invention utilizing three characteristic data fields and two stages of cylinder shut-off.

DESCRIPTION OF THE ILLUSTRATED EMBODIMENTS

Figure 1:
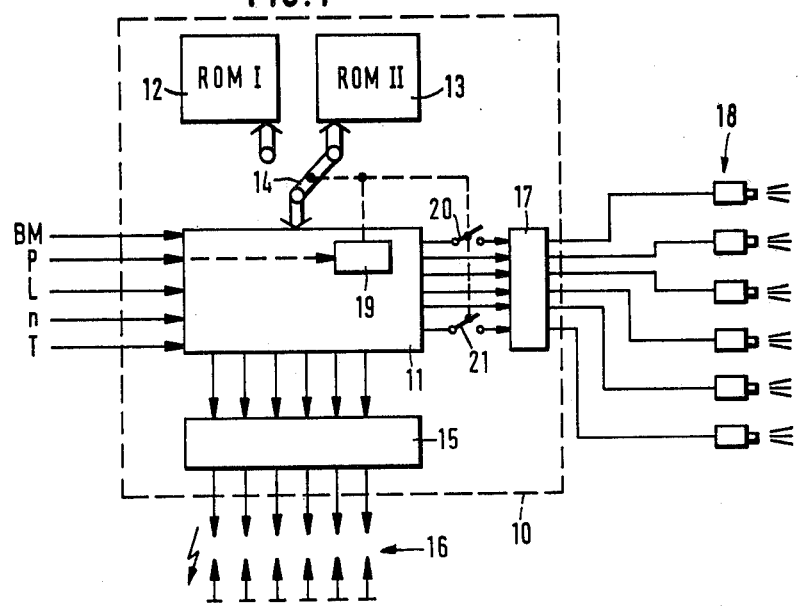

As shown in FIG. 1, a computer 10 receives information in a well-known way regarding the operating state of an internal combustion engine which it serves. The various inputs are indicated at the left and include reference mark signals (BM) relating to crankshaft or flywheel rotation, intake manifold vacuum signals (p), intake air quantity (L), crankshaft speed signals (n) and temperature signals (T). The computer 10 has an arithmetic unit 11, in which there is derived from the input signals received from the various transducers of the engine, an address for the first fixed values store 12, also designated ROM I, or to a second fixed value store 13 (ROM II). Memories 12,13 are connected to the arithmetic unit 11 through a transfer switch 14. In response to the address provided by the arithmetic unit, a point of the stored characteristic field is selected and from the values there stored the ignition timing and the fuel injection data are calculated. Such calculations are well known in the art and are sufficiently described in many publications, so that it is not necessary to describe them here. In other words, the stored data provides all that is needed to set the correct ignition timing and fuel injection by means of whatever subsequent processing of the data may be necessary or convenient.

After some processing in the arithmetic unit 11, the data received from the ROM are passed in part to the first final stage 15 for control of the sparkplugs 16 and in part to the second final stage 17 for control of the fuel injection valves 18 for injecting fuel into the engine. The control of the sparkplug ignition can be provided in one of the many known ways utilizing electronic and mechanical high-voltage ignition pulse distribution.

In normal load operation, all fuel injection valves 18 are operated and the transfer switch 14 connects the fixed values memory 12 to the arithmetic unit 11. If now the engine is operated with only partial load, then the partial load recognition stage 19 within the arithmetic unit 11, to which the load signal p is furnished, changes its state when the load is reduced below a predetermined level defined by the signal p, providing a signal that switches over the two switches 20 and 21 interposed in the connections to the final stage 17, opening the switches, with the result that the first and sixth fuel injection valves 18 are no longer actuated, so that in further operation only the fuel injection valves 2 to 5 are maintained in operation. At the same time, there is produced the switching over of the transfer switch 14 to the second fixed values memory 13, that provides a characteristic data field suitable for operation with only the remaining four fuel injection valves working.

Figure 2:
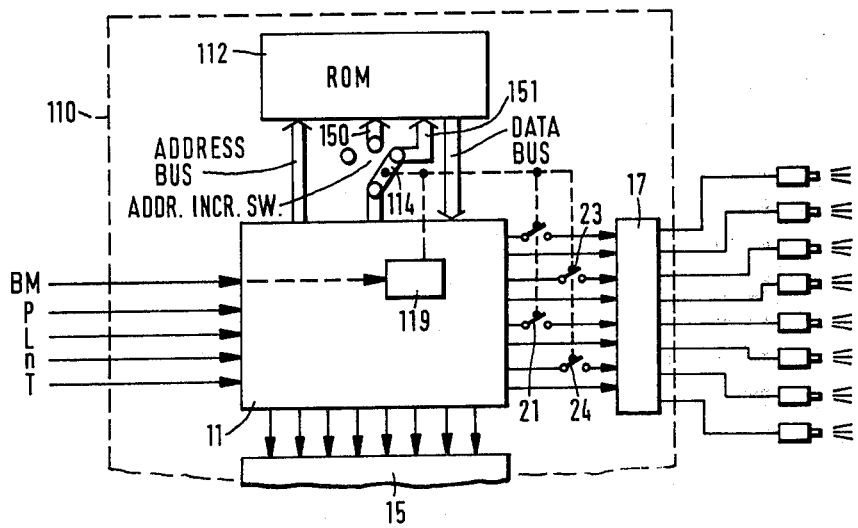

The switching off of fuel injection valves, and hence of cylinders of the engine, can naturally occur in several stages, as illustrated in FIG. 2, which differs from FIG. 1 in providing a three-position transfer switch 114 instead of the two-position transfer switch 14, eight fuel injection valves 18 corresponding to an eight-cylinder motor, instead of the six shown in FIG. 1 and two additional switches 23 and 24 which are opened when the transfer switch 114 is in its third position, for which the switches 21 and 22, opened in the second position, remain open. A single high-capacity ROM is used to store three complete characteristic fields. The three fields are stored in an arrangement by which the field may be selected by incrementing the address by one or two different values, or by not incrementing it at all. The field-selecting address increment can be provided by prefix bit (00 for position 1, 01 for position 2, 10 for position 3, for example or in some other way. In the illustrated case, the switch 114 provides a connection to an input 150 to produce a first level of address increment and a connection to an input 15 to produce a second level of address increment.

The arrangement of FIG. 2 provides for switching in an eight-cylinder engine that operates at full load with control by a first characteristic field down to six cylinder operation with assignment of a second characteristic field for control of ignition and fuel injection, and for switching it down further to four-cylinder operation and simultaneous transfer of the switch 114 to a third position for control of the engine by a third characteristic data field. Thus, three characteristic fields are provided for ignition and fuel injection control respectively for eight, six and four-cylinder operation of the engine.

It is also possible to switch off cylinders progressively one by one, rather than by pairs.

The invention is not limited to the switching off of cylinders by interruption of the control signals for the fuel injection valve. The switching off of cylinders can just as well be provided by valves in the intake piping, particularly in the intake branch ducts, or by disabling the intake valves.

Of course, the means for computing the fuel injection and for computing the ignition timing need not be combined in a single computer and could just as well be performed, within the present invention concept, by separate computers, either using separate memories or using different addresses in a common memory. In any case, the characteristic fields for ignition control and for fuel injection control would be provided in duplicate (or triplicate, etc.), respectively for full load and partial load operation, and the selection of fields in step with the disabling of some of the cylinders would be provided in accordance with the invention.

For the known methods of calculation of ignition timing and fuel injection from read-only memory data constituting a characteristic field (the multidimensional equivalent of a characteristic curve), reference is made to the following:

SAE-Paper No. 800165
U.S. Pat. No. 4,204,256
U.S. Appl. Ser. No. 56,960 filed July 12, 1979

We claim:

1. Multi-cylinder internal combustion engine and ignition and fuel injection control system combination having memory means (12, 13; 112) for storing engine operating characteristics;

computing means (11) connected to the memory means for receiving engine operating parameter signals (BM, p,L,n,T), and providing engine operating output signals, in accordance with, and as a function of stored engine operating characteristics;

and output interfaces (15, 17) controlling ignition and fuel injection events, respectively, in respective cylinders of the engine, connected to and receiving the engine operation output signals from said computing means;

said combination having means (20, 21, 23, 24) for selectively reducing the number of working or operating cylinders in accordance with loading on the engine, by interrupting the supply of fuel to some of the cylinders of the engine, wherein, in accordance with the invention, the memory means comprises a plurality of storage fields or addresses (12, 13; 112, 150, 151), each storing a substantially complete set of data representing engine operating characteristics with respectively different numbers of operating or working cylinders; for means (19, 119)/recognizing conditions of engine operation with less than all of the cylinders;

and switching means (14, 114) connected to and controlled by the engine operation condition recognition means (19, 119) connecting that one of the storage fields or addresses of the memory means to the computing means for storing the set of the data representing engine operating characteristics with the then operating number of the cylinders of the engine.

2. A system as defined in claim 1, in which said working cylinder number reduction means is constituted by switching means responsive to a signal representative of the load on said engine.

3. A system as defined in claim 1, in which said cylinder number reduction means has a plurality of steps of operation by which the number of working cylinders is progressively reduced at each of said steps of operation, each step of further reduction corresponding to a more lightly loaded engine operation condition.

4. A system as defined in claim 3, in which said working cylinder number reduction means is constituted by switching means responsive to a signal representative of the load on said engine.

5. Method of operating a multi-cylinder internal combustion engine having an ignition and fuel injection control system which includes memory means (12, 13; 112) for storing engine operating characteristics;

computing means (11) connected to the memory means for receiving engine operating parameter signals (BM, p,L,n,T), and providing engine operation output signals, in accordance with and as a function of stored operating characteristics, and means (20, 21, 23, 24) for selectively reducing the number of working cylinders in accordance with loading on the engine by interrupting the supply of fuel to some of the cylinders of the engine, comprising the steps of storing, in a plurality of discrete storage fields or addresses, substantially complete sets of data representing engine operating characteristics with respectively different numbers of operating cylinders;

recognizing conditions of engine operation with less than all the cylinders;

and controlling the computing means in accordance with the data stored in that one of the discrete storage fields or addresses which stores the engine operating characteristics with that number of cylinders which are then in operation or working.

* * * * *

UNITED STATES PATENT AND TRADEMARK OFFICE
CERTIFICATE OF CORRECTION

PATENT NO. : 4,398,520
DATED : August 16, 1983
INVENTOR(S) : Alfred SCHULZ et al It is certified that error appears in the above—identified patent and that said Letters Patent is hereby corrected as shown below:

Claim 1, col. 4, line 17 delete "for", line 18 delete " / " and insert -- for --.

Signed and Sealed this

Twenty-second Day of November 1983

[SEAL]

Attest:

GERALD J. MOSSINGHOFF

Attesting Officer   Commissioner of Patents and Trademarks